United States Patent [19]

Bastiao

[11] 4,208,135

[45] Jun. 17, 1980

[54] MIXING DEVICE

[76] Inventor: Manuel J. Bastiao, 5212 Bayou Way, Sacramento, Calif. 95837

[21] Appl. No.: 956,681

[22] Filed: Nov. 1, 1978

[51] Int. Cl.² .............................................. B01F 7/08
[52] U.S. Cl. .................................... 366/219; 366/239
[58] Field of Search ............................. 366/219–224, 366/232, 233, 237–240

[56] References Cited

U.S. PATENT DOCUMENTS

| | | | |
|---|---|---|---|
| 1,651,390 | 12/1927 | Hersman | 366/234 |
| 3,946,996 | 3/1976 | Gergely | 366/224 |

*Primary Examiner*—Leonard D. Christian
*Attorney, Agent, or Firm*—Blair, Brown & Kreten

[57] ABSTRACT

Disclosed herein is a mixing device suitably fashioned for assuring a substantially uniform mix of seeds and planting medium such as peatmoss. The apparatus is defined by a framework which supports a drum capable of rotation not only about it's elongate axis, but also rotation about an axis orthogonal thereto. A door is provided for ingress of material, a spout for egress therefrom, and mixing blades are disposed within the drum's interior to assure the proper mix.

10 Claims, 4 Drawing Figures

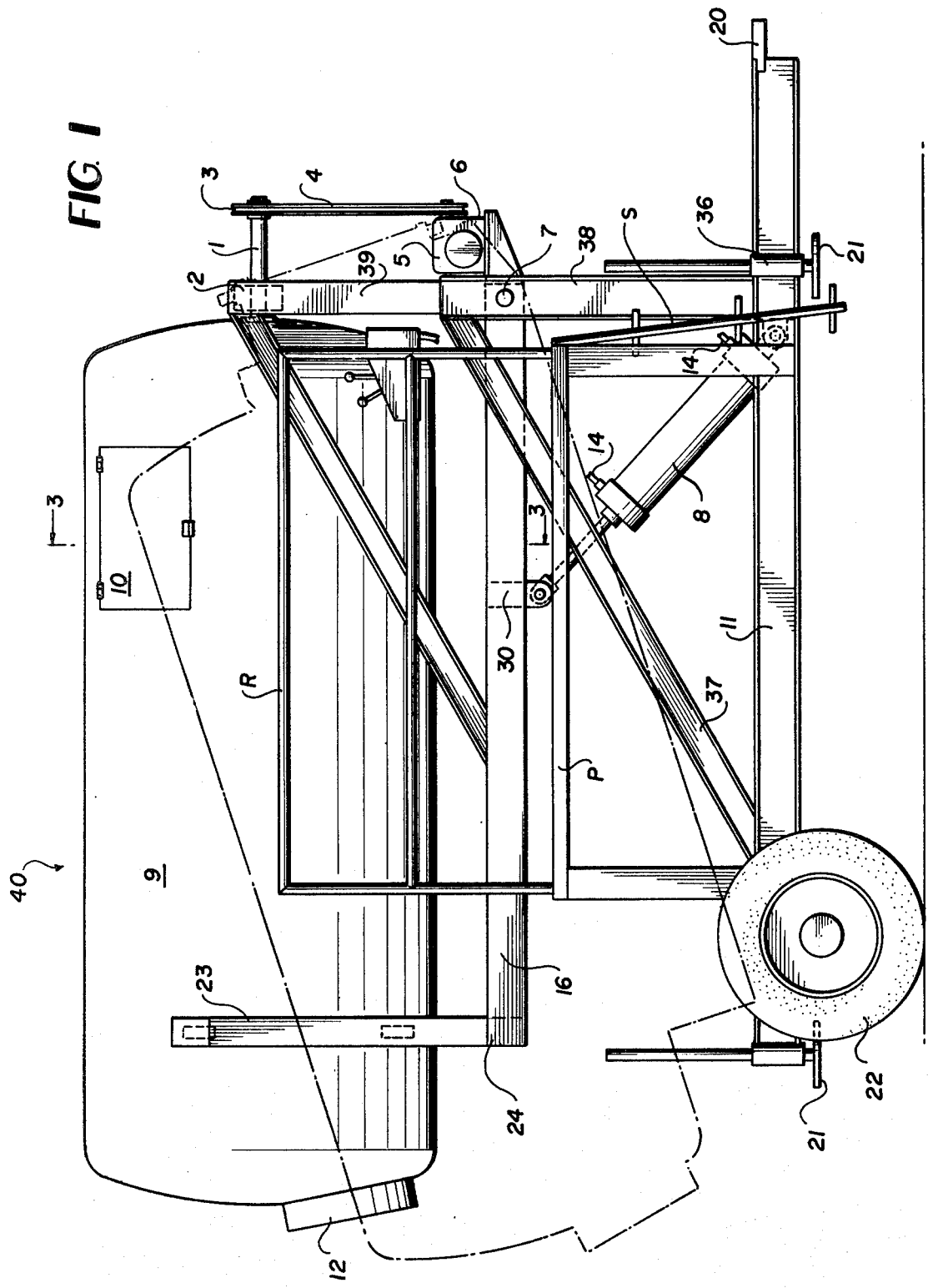

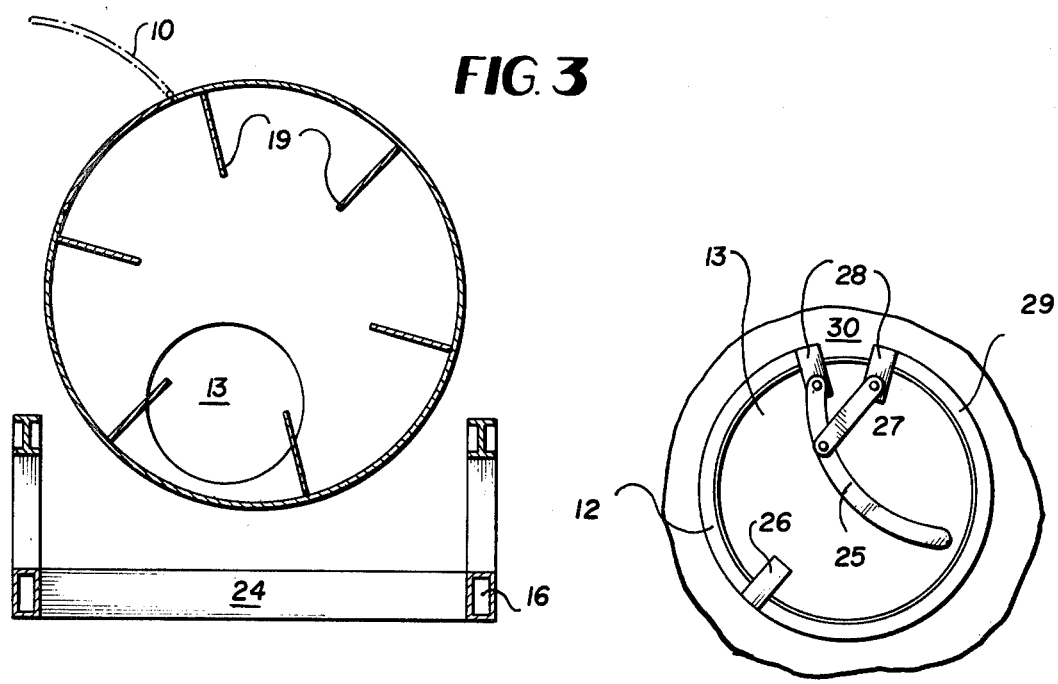

MIXING DEVICE

BACKGROUND OF THE INVENTION

Mixing devices in general have been known to present many problems when one is concerned with providing a quantized disposition on particulate matter such as seeds for planting. Specifically, when the seed is mixed with a rooting medium such as peatmoss, it is important to have approximately a uniform distribution of seeds within the peatmoss mixture so that the planting that takes place is not only uniform but of the proper density. Prior art devices have been inadequate simply because the ratio of seed to planting medium is not only inconstant, but also is additionally not fully mixed in a random sample.

Prior art devices of which the applicant is aware includes the following four U.S. Pat. Nos.:

1,713,245 Weiss et al 3,071,295 Heller 3,181,842 Eckert 3,021,566 Sommer

Heller teaches the use of a bulk feeding apparatus wherein one type of material is to be discharged at a uniform rate. Heller is not concerned with mixing as does present application, and the structure associated with his apparatus merely tends to assure that a single substance will be discharged at a uniform rate.

Weiss et al is concerned with a mechanical movement for rotating a cylindrical vessel such as a washing machine along two axis, and the mechanical structure associated therewith is not seen to assure that a plurality of components disposed therein will be discharged at uniform ratios.

Sommer teaches the use of a method for the production of compositions in which mixing takes place prior to insertion in the agitating drum in order to maintain the proper balance and dissemination of the particulate matter.

Eckert teaches the use of a portable drum in which the roller means for rotating the drum is stationary. Accordingly, the associated structure therewith is somewhat more simplified, but the drum is incapable of rotation in a plurality of directions as does the present application.

SUMMARY OF THE INVENTION

Accordingly, this invention has as an object to provide the mixture of seeds and planting mediums such as peatmoss in a substantially constant rate. When planting fruits such as tomatoes in the seedling stage, the mixture of tomato seeds and peatmoss as well as other materials such as sand, vermiculite and other substances must be distributed in such a manner that when the material is discharged from the mixing station in clump like quantities, there is an assurance that the seeds will be contained within each clump. This can easily be checked as to the consistency of the mixture by taking one clump, disposing this clump in water and allowing constituents to separate. The seeds will gravatate to the bottom of the water in the jar, and the other material will float. It is therefor quite easy to see whether or not there is a uniform dispersion of seeds within any given clump, and the current mixing machine according to the present invention is intended to be used in conjunction with a clumping machine or the like in order to achieve a uniform planting. If the planting is somewhat thicker than 5 or 6 seeds per clump, a hardship exists since excessive thinning will be required. Conversely if the seed disposition is too thin, either the farmer will have to replant in the bare spots, or he will be using his land inefficiently. In the attempt to achieve uniform mixtures, some farmers have resorted to using cement type mixers but in the comparison, the uniform distribution of the seeds according to the present structure far surpasses that of any conventional mixing device known.

Accordingly, an object of this invention is to provide a seed mixing mechanism in which the seeds will be uniformally distributed throughout the planting medium.

A further objective contemplates providing a mixing device which is easy to operate, and can be transported to the planting site if so desired.

It is yet another object of this invention to provide a novel and distinct portal which permits the egress of the mixing material.

These and other objects will be made manifest when considering in detail the ensuing specifications and drawings.

BRIEF DESCRIPTION OF THE DRAWINGS

FIG. 1 shows a side view of the mixing device according to the present invention.

FIG. 2 is an end view thereof.

FIG. 3 is a sectional view taken along line 3—3 of FIG. 1.

FIG. 4 is an end view of the mixing device showing the structure of the outlet portal.

DESCRIPTION OF THE PREFERRED EMBODIMENT

Referring now to the drawings now wherein like reference numerals refer to like parts throughout the several drawings, reference numeral 40 is generally directed to the mixing device according to the present invention.

This mixing device 40 can generally be regarded as being provided with a supporting frame structure defined by a base 11 having a rear cross base, and side bars which terminate in one embodiment in a tongue 20. The figures depicted that this frame is at one extremity supported by wheels 22 carried on axle 18 through suitable bearings, but it is equally apparrant that the framework could be stationary.

When the mixing device is utilized in a mobile fashion as shown, support stands 21 having generally a flat bottom surface and upwardly extending rod members can slide within sleeve elements 36. Sleeve 36 is provided with a suitable means for retaining element 21 in a fixed position so as to support the mixing apparatus.

The main frame 11 has extending diagonally up therefrom a cross base 37 to provide additional rigidification to the mixing structure and it is to be noted that on column member 38 and attached by pivot pin 7 it is a second frame member 39 shown in FIG. 1 as being vertically oriented and attached to the mixing tank frame in a manner well known in the art. The angulation of the frame holding the mixture is varied by means of cylinder 8 which is fastened to the mixing tank frame 16 by pivot link 30, and although hydraulic lines 14 eminate outwardly from the cylinder an equivalent type of extension device could be used for the purpose of orienting the mixer. The frame 16 has at the extremity remote from the column member 39 and upwardly extending support bracket of U-shape configuration defined by reference numerals 23 and 24 so as to provide a support for mixing drum 9 at that area. FIG. 2 shows that the drum 9 is nested and supported by rollers 17. The drum is rotated around shaft 1 by means of a sprocket 3 which may be chain or belt driven 4 and the output of hydraulic motor 6 is varied by means of gear box 5. Shaft 1 of course is suitably supported by bearing 2 and since the motor 6 and gear box 5 are supported on the mixing tank frame, rotation of that frame by means of hydraulic cylinder 8 will also cause a similar rotation of this driving mechanism. FIG. 2 also shows a control lever arrangement 15 with hydraulic hoses 14 eminating outwardly therefrom intended to be connected not only to the motor 6, but also to the cylinder 8. In operation, one of the levers 15 would control the tilting of the mixing frame 16 through hydraulic cylinder 8 and it is apparent that the motion of the lever in one direction will raise the frame, and motion of the lever in another direction will reverse that direction. Similarly, the other lever is provided with three positions so that the drum may rotate in a counterclockwise or clockwise direction upon suitable manipulation of the lever.

The drum 9 is provided along it's cylindrical face with a door 10 preferably disposed more closely to the drive shaft, and the door is hinged and latched in a manner well known in the art. The unloading spout however, is disposed at the extremity remote from the drive mechanism and is offset relative to the horizontal or cylindrical axis of the drum. The door as best seen in FIG. 4 is provided with a cover 13 which is hinged to the spout through hinge link 26. The spout is provided with a flange 29 running around the entire periphery of the spout with the exception of cut away portion 30. The locking mechanism as shown in FIG. 4 can now therefor be defined. A first sheath 28 is connected to a link 25 through pivot, and link 25 will serve as the actuating handle. A second sheath 28 is disposed on the flanged portion 29 and both are released by their rotation into the opening 30, so that the door may therefore be opened. It is apparent that the pivot point where link 27 engages handle 25, may be fixed on the spout cover 13 so that it is not removable therefrom. The hinge 26 of course causes the cover to be rotated away from the spout to allow the mixed material to be removed.

An important feature of this mixing apparatus is disclosed within the interior portion of the drum FIG. 3 wherein it will be observed that a plurality of vanes 19 are directed radially inwardly and can be seen to be fixed to the inner cylindrical surface of the mixing drum and extend substantially the entire length thereof. It is found that fewer than 6 vanes will not provide the most effective mixing and it is believed that an additional number of vanes will not increase the reliability of the mix to any appreciable degree. In any event, vanes 19 serve to carry the components to be mixed in such a manner that when the compound to be mixed reaches an almost vertical position it will fall straight down onto the bottom of the cylindrical mixing tank. It has been found that a revolution speed of 6 RPM is an ideal turning rate to assure that the mix when it is at it's apogee will not experience centrifugal force and tend to remain and be carried by the outer portion of the drum; the motor itself turns at 25 RPM.

FIGS. 1 and 2 show an adjunct whereby the person may approach the mixing device along the side thereof by climbing up stair S FIG. 1 and walking along platform P which is provided with guard rails R.

Having thus described the invention it will be apparent that the numerous structural modifications are contemplated as being a part of this invention as taught here and above and specified hereinbelow by the claims.

What is claimed is:

1. A mixing device comprising a main framework, a secondary frame pivotably connected to said main frame, a mixing tank supported on said secondary frame, said mixing tank having mixing vanes therewithin and a loading door disposed on said mixing tank, and an unloading spout disposed on said mixing tank, said unloading spout including a hinged lockable cover overlying said spout, an interrupted flange surrounding said spout carried on said mixing tank, a pair of sheathes straddling the interrupted portion of said flange, a link extending from each sheath pivotally pinned together and to said cover, one of said links longer than the other whereby when said longer link is rotated about the pivot area, said sheathes come together at the interrupted portion of the flange and said cover can be opened.

2. The device of claim 1 in which said secondary frame rotates relative to said main frame through a pivot pin interconnecting said last mentioned frames and a hydraulic cylinder extends therebetween to provide the rotation.

3. The device of claim 2 wherein said mixing drum is supported on said secondary frame by a shaft which rotates said mixing drum, and motor means connected to said shaft to rotate said shaft and mixing drum.

4. The device of claim 3 in which said mixing drum has a generally drum like appearance having a cylindrical middle portion, said mixing vanes are disposed on an inner cylindrical face thereof oriented radially inwardly substantially along the cylindrical length thereof.

5. The device of claim 4 wherein said main frame defines a pair of spaced side bars, a rear crossbrace interconnected between said side bars and said side bars terminate in a tongue remote from said crossbrace.

6. The device of claim 5 wherein said main frame is carried on a wheeled axle and support stands comprising a flat bottom plate, upwardly extending rod members eminating therefrom fasten through sleeve elements disposed on said main frame.

7. The device of claim 6 wherein said loading door is placed on the cylindrical portion of said mixing tank and said unloading spout is disposed on an end portion of said mixing drum remote from said shaft.

8. The device of claim 7 wherein said secondary frame comprises a U-shaped brace cradling said mixing tank at one end connected to a pair of frame members which underlie said mixing tank and extend to the pivotal connection with said main frame.

9. The device of claim 8 in which wheel supports are interposed between said U-shaped brace of said secondary frame and said mixing tank.

10. The device of claim 9 including control means operatively connected to said motor means and said hydraulic cylinder.

* * * * *